United States Patent [19]

Mizoh et al.

[11] Patent Number: 5,426,550
[45] Date of Patent: Jun. 20, 1995

[54] MULTITRACK MAGNETIC HEAD ASSEMBLY FOR SCANNING A MAGNETIC TAPE WITH A PLURALITY OF MAGNETIC HEAD TIPS

[75] Inventors: Yoshiaki Mizoh; Hiroshi Yohda, both of Osaka, Japan

[73] Assignee: Matsushita Electric Industrial Co., Ltd., Osaka, Japan

[21] Appl. No.: 86,450

[22] Filed: Jul. 6, 1993

Related U.S. Application Data

[63] Continuation of Ser. No. 712,368, Jun. 10, 1991, abandoned.

[30] Foreign Application Priority Data

Jun. 8, 1990 [JP] Japan .................................. 2-150950

[51] Int. Cl.⁶ ........................ G11B 5/255; G11B 5/53
[52] U.S. Cl. ..................................... 360/122; 360/107
[58] Field of Search ................ 360/84, 95, 85, 130.22, 360/130.23, 137, 130.24, 127, 122, 125, 126, 127, 107; 29/603

[56] References Cited

U.S. PATENT DOCUMENTS

| 4,318,146 | 3/1982 | Ike et al. ............................... 360/84 |
| 4,603,360 | 7/1986 | Fujiki et al. ........................... 360/84 |
| 4,722,015 | 1/1988 | Ushiro ................................... 360/84 |
| 4,849,839 | 7/1989 | Tsubota et al. ........................ 360/84 |
| 4,890,378 | 1/1990 | Suzuki et al. ......................... 360/127 |
| 4,947,542 | 8/1990 | Satomi et al. ......................... 360/127 |

FOREIGN PATENT DOCUMENTS

| 61-150113 | 7/1986 | Japan . |
| 63-69014 | 3/1988 | Japan . |
| 63-266622 | 11/1988 | Japan . |
| 1-13211 | 1/1989 | Japan . |

Primary Examiner—Robert S. Tupper
Assistant Examiner—Paul J. Ditmyer
Attorney, Agent, or Firm—Lowe, Price, LeBlanc & Becker

[57] ABSTRACT

A multitrack magnetic head for use with a magnetic tape in a magnetic recording and reproducing system includes at least two magnetic head tips disposed adjacent to each other and movable with respect to the magnetic tape. The head tips include a leading head tip for initial sliding contact with the magnetic tape and a trailing head tip for subsequent sliding contact with the magnetic tape. The leading head tip is made of a material whose wear resistance is greater than that of a material of which said trailing head tip is made. The head tips are held in good sliding contact with the magnetic tape for better recording and reproducing characteristics.

2 Claims, 8 Drawing Sheets

MULTITRACK MAGNETIC HEAD ASSEMBLY FOR SCANNING A MAGNETIC TAPE WITH A PLURALITY OF MAGNETIC HEAD TIPS

This application is a Continuation; application of application Ser. No. 07/712,368, filed Jun. 10, 1991.

BACKGROUND OF THE INVENTION

1. Field of the Invention

The present invention relates to a magnetic head for use in audio, video, computer, and other applications, and more particularly to a magnetic head which is of such a structure as to keep good sliding contact with a magnetic tape for recording and reproducing signals at a high rate.

2. Description of the Prior Art

Recent magnetic recording and reproducing apparatus with rotary head drums for helical scan employ dedicated multitrack magnetic heads for recording and reproducing wide-band video signals, FM audio signals, PCM audio signals, and for erasing signals by flying erasure.

Generally, a helical-scan magnetic recording and reproducing system employs a plurality of magnetic head tips, which are all identical in shape and are made of the same material, disposed closely to each other and mounted in one window or recess in the outer circumferential surface of a rotary head drum or cylinder. The configuration of projecting portions of the head tips, and the curvature thereof in a direction transverse to the tracks are optimized for uniform contact with the magnetic tape.

Each of the magnetic head tips may be a ferrite head tip or a laminated head tip. The laminated head tip comprises a metallic magnetic body or layer sandwiched between nonmagnetic substrates, the metallic magnetic body defining a magnetic path.

To meet recent demands for long-time, high-capacity recording capabilities, thinner magnetic tapes for use in magnetic recording systems are under development. It is known, however, that the stiffness of a magnetic tape decreases in inverse proportion to the cube of the thickness thereof.

When signals are recorded on and reproduced from a standard-time recording thick magnetic tape with multitrack magnetic heads, the front configuration or contour of the head tips wears into a large radius of curvature in its transverse direction because of intimate contact with the thick magnetic tape. In general, when successive magnetic head tips are held in sliding contact with a magnetic tape, the leading head tip which is brought into initial sliding contact with the magnetic tape is subject to higher pressure than the trailing head tip which is brought into subsequent sliding contact with the magnetic tape. The higher pressure is developed because the magnetic tape flexes due to an air stream caused by the rotation of the head drum and also because the magnetic tape and the magnetic head tips move relatively to each other. Particularly, since the magnetic head tips are made of the same material, the leading head tip with respect to the direction of rotation of the head drum wears to a larger extent than the trailing head tip. Consequently, the transverse radius of curvature of the leading head tip becomes greater than that of the trailing head tip. When signals are subsequently recorded on and reproduced from a long-time recording thinner magnetic tape with the same head tips, since the thinner magnetic tape is of lower stiffness, it flexes greatly in the transverse direction, and is not sufficiently held in good contact with the leading head tip. As a result, the spacing loss is increased, and the reproduced output of the leading head tip is lower in level than the reproduced output of the trailing head tip. The reduction in the reproduced output of the leading head tip can be observed as a deterioration of the output waveform envelope.

There has heretofore been an attempt to reduce the radius of curvature of leading head tips in the transverse direction for solving the above problems. The radius of curvature greatly varies as the magnetic head tips wear, and different magnetic heads wear to different degrees as the wear progresses, resulting in different radii of curvature thereof. Therefore, the prior attempt has proven ineffective in completely eliminating the aforesaid drawbacks.

SUMMARY OF THE INVENTION

It is an object of the present invention to provide a magnetic head which will prevent the reproduced output of a leading magnetic head from being reduced when used in a multitrack magnetic head application for helical scanning of a magnetic tape.

According to the present invention, there is provided a multitrack magnetic head for use with a magnetic tape, comprising at least two magnetic head tips disposed adjacent to each other, the head tips being movable with respect to the magnetic tape and including a leading head tip for initial sliding contact with the magnetic tape and a trailing head tip for subsequent sliding contact with the magnetic tape, the leading head tip being made of a material whose wear resistance is greater than that of a material of which the trailing head tip is made.

The wear resistance is measured in terms of specific wear. When a magnetic tape and a magnetic head relatively move in sliding contact with each other, the magnetic head wears in proportion to the pressure under which it is contacted by the magnetic tape. When a magnetic tape runs against a conventional multitrack magnetic head which has leading and trailing head tips of the same material, since the pressure applied to the leading head tip is higher than that which is applied to the trailing head tip, the leading head tip undergoes greater wear than the trailing head tip, and wears into a greater radius of curvature in the radial direction. With the magnetic head according to the present invention, since the specific wear of the leading head tip is smaller than that of the trailing head tip, the leading head tip may wear to substantially the same extent as that of the trailing head tip. Consequently, the transverse radius of curvature of the leading head tip remains substantially the same as that of the trailing head tip, so that the leading head tip is held in sliding contact with the magnetic tape in substantially the same manner as the leading head tip is held in sliding contact with the magnetic tape. Any appreciable reduction which would otherwise be produced in the reproduced output of the leading head tip can thus be prevented from occurring.

The higher wear resistance of the material of the leading head tip than that of the material of the trailing head tip allows the magnetic head to be held in good sliding contact with the magnetic tape, thus preventing a reduction in the reproduced output of the leading head tip owing to a spacing loss, and hence a deterioration of the waveform envelope of the reproduced output of the leading head tip. Even though the head tips are worn, their configurations for sliding contact with the magnetic tape are maintained for good recording and reproducing characteristics.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Wear resistance of magnetic heads is evaluated in terms of specific wear which is represented by a volume worn per unit running time. More specifically, the specific wear is determined by a wear test. In the wear test, magnetic heads which are all identical in shape and are made of various materials are mounted on a rotary head drum or cylinder in a magnetic recording and reproducing system, the magnetic heads having equal radii of curvature and project to equal degrees at their tip ends, and the volumes worn of the magnetic heads after a magnetic tape has run against the magnetic heads for a predetermined period of time are divided by the distance the magnetic tape has run. The specific wear is represented by the quotient. The specific wear of the magnetic heads depends on the magnetic tape used with the magnetic heads and the material of the magnetic heads. The volumes which are worn are determined by measuring the dimensions of the magnetic heads with a feeler-type surface roughness meter before and after the wear test, and the differences between the measured volumes are calculated.

In the present invention, a wear test was conducted using a VHS-format VTR deck, with magnetic heads of various materials mounted on the rotary head drum. The specific wear of the magnetic heads was measured by dividing the volumes worn of the magnetic heads after a commercially available S-VHS video tape has run against the magnetic heads in the VTR deck for 100 hours, by the distance the video tape has run (the distance = the running time × the relative velocity between the magnetic heads and the video tape).

Figure 1:
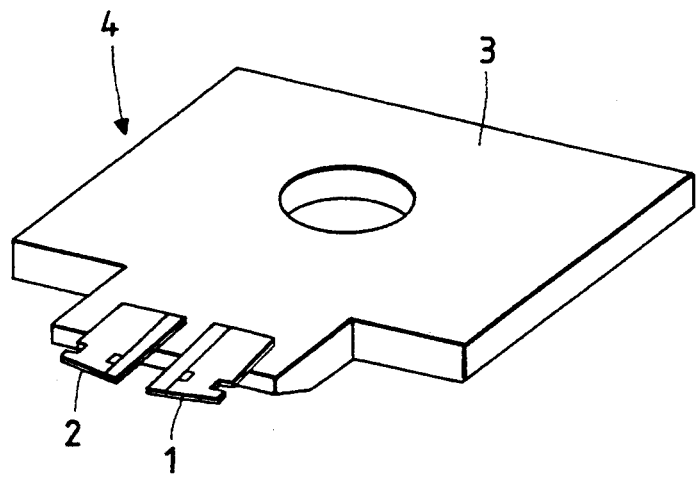
FIG. 1 is a perspective view of a magnetic head according to an embodiment of the present invention.
Figure 2:
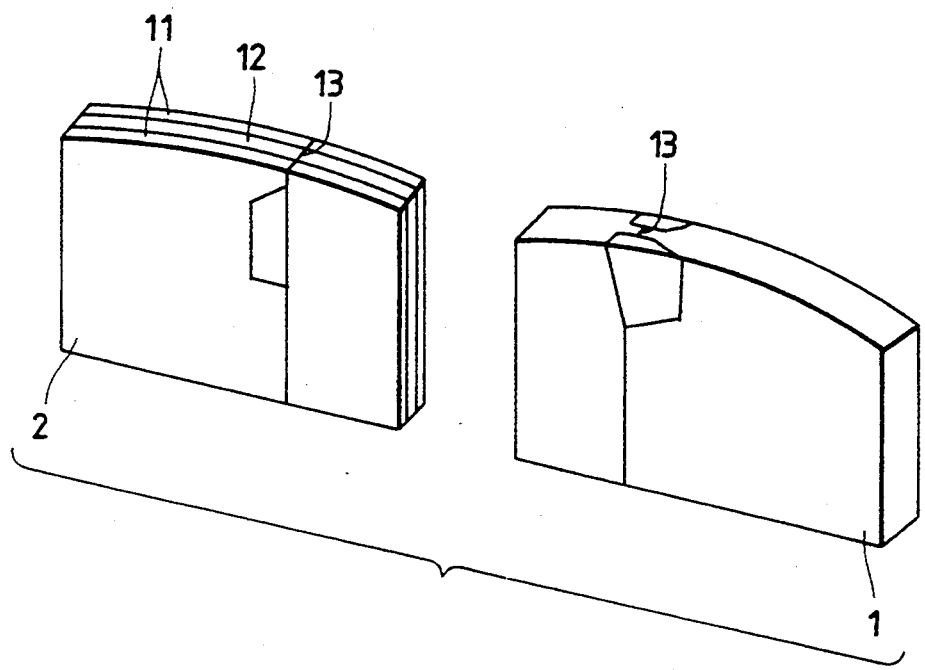
FIG. 2 is an enlarged perspective view of head tips of the magnetic head shown in FIG. 1.

FIG. 1 shows a multitrack combination magnetic head according to an embodiment of the present invention. The magnetic head, generally designated by the reference numeral 4, comprises a pair of leading and trailing head tips 1, 2 mounted on an edge of a head base 3 at a spaced interval. The leading head tip 1 first comes into sliding contact with a magnetic video tape, as described later on. The leading head tip 1 is made of Mn-Zn (manganese-zinc) ferrite whose specific wear has a value of $5.0 \times 10^{-18} m^2$. As shown in FIG. 2, the trailing head tip 2 is of a laminated structure comprising a magnetic body or layer 12 of cobalt-base amorphous alloy which serves as a magnetic path and is sandwiched between nonmagnetic substrates 11 each made of an $NiO$-$TiO_2$-$MgO$ (nickel oxide-titanium dioxide-magnesium oxide) ceramic material whose specific wear has a value of $7.2 \times 10^{-18} m^2$. Each of the leading and trailing head tips 1, 2 has a magnetic gap 13.

Figure 3:
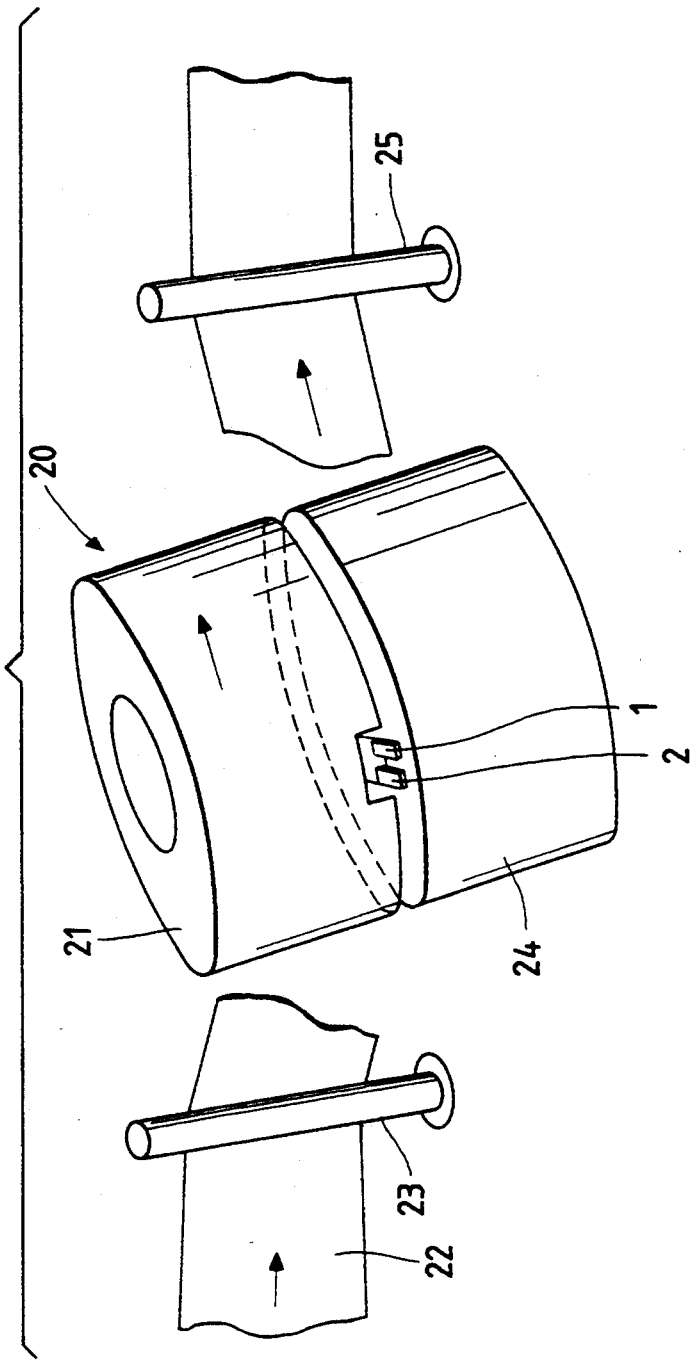
FIG. 3 is a perspective view of a magnetic recording and reproducing apparatus which incorporates the magnetic head shown in FIG. 1.

FIG. 3 shows a magnetic recording and reproducing apparatus which incorporates the magnetic head shown in FIG. 1. The magnetic recording and reproducing apparatus includes a rotary head drum or cylinder assembly 20 which comprises an upper rotary head drum or cylinder 21 and a lower rotary head drum 24. The magnetic head 4 is disposed between the upper rotary head drum 21 and the lower rotary head drum 24 and positioned in a window or recess defined in the outer circumferential surface of the upper rotary head drum 21, with the head tips 1, 2 projecting from the outer circumferential surfaces of the rotary head drums 21, 24. A magnetic video tape 22 is guided by inclined guide posts 23, 25 disposed one on each side of the rotary head drum assembly 20, so that the magnetic video tape 22 runs against the outer circumferential surface of the rotary head drum assembly 20. The head tips 1, 2 serve as leading and trailing heads, respectively, when the magnetic video tape 22 runs in the same direction as the direction in which a rotary head drum assembly 20 rotates. Therefore, the leading head tip 1 is brought into sliding contact with the magnetic video tape 22 earlier than the trailing head tip 2.

Figure 5A:
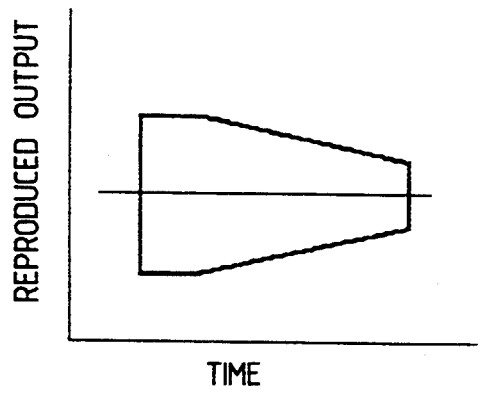
FIGS. 5A and 5B are diagrams showing the waveform envelopes of reproduced outputs from head tips according to a comparative example.
Figure 5B:
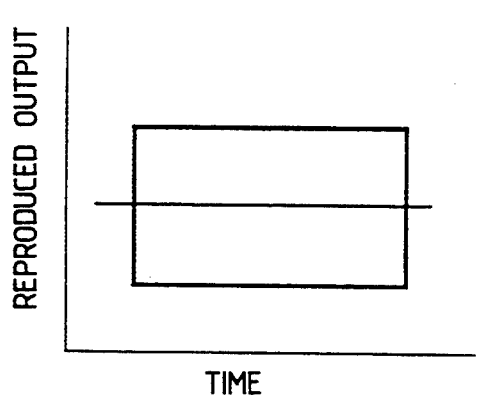

With a conventional multitrack combination magnetic head having leading and trailing head tips which are all identical in surface areas contacting the magnetic tape and are made of the same material, the leading head tip is contacted by a magnetic video tape under higher pressure than the trailing head tip. Therefore, the leading head tip wears more rapidly into a greater transverse radius of curvature than the trailing head tip. When a thinner magnetic video tape is played back by the conventional combination magnetic head, the leading head tip is not held in good contact with the magnetic video tape, and its reproduced output decreases in level. FIG. 5A shows the waveform envelope of the reproduced output of the leading head tip of the conventional combination magnetic head, whereas FIG. 5B shows the waveform envelope of the reproduced output of the trailing head tip thereof. It can be seen from FIGS. 5A and 5B that the reproduced output of the leading head tip becomes progressively lower in level with time.

Figure 4A:
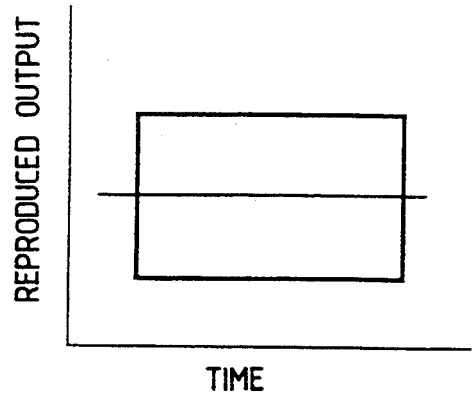
FIGS. 4A and 4B are diagrams showing the waveform envelopes of reproduced output of the head tips shown in FIG. 2.
Figure 4B:
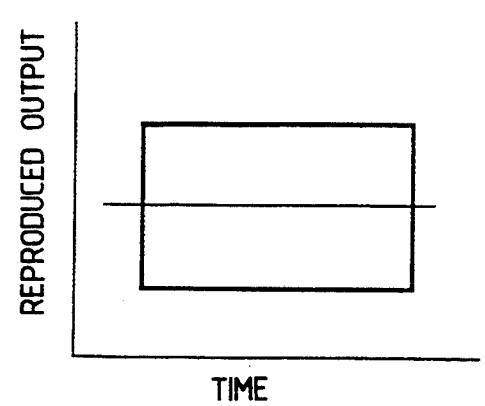

According to the present invention, however, the leading head tip 1 and the trailing head tip 2 wear to substantially equal degrees because of their materials. Therefore, the transverse radii of curvature of the leading and trailing head tips 1, 2 are substantially the same as each other, and these leading and trailing head tips 1, 2 produce output levels that are essentially the same as each other. The waveform envelopes of the reproduced outputs of the leading and trailing head tips 1, 2 are substantially equal to each other and remain substantially constant with time, as shown in FIGS. 4A and 4B.

Figure 10:
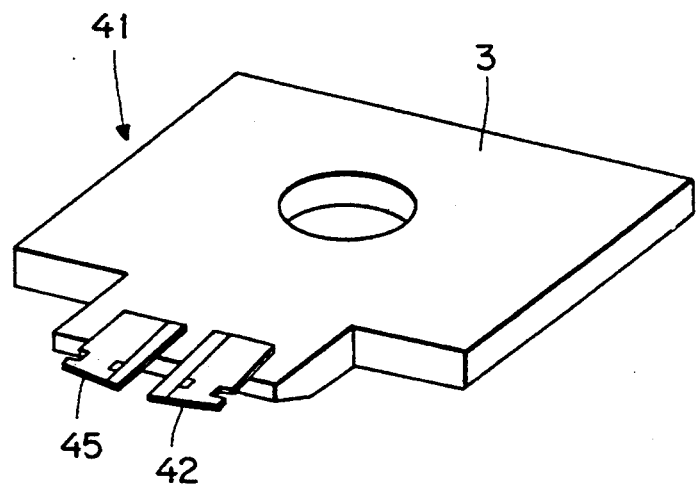
FIG. 10 is a diagonal view of a magnetic head according to another embodiment of the present invention.
Figure 11:
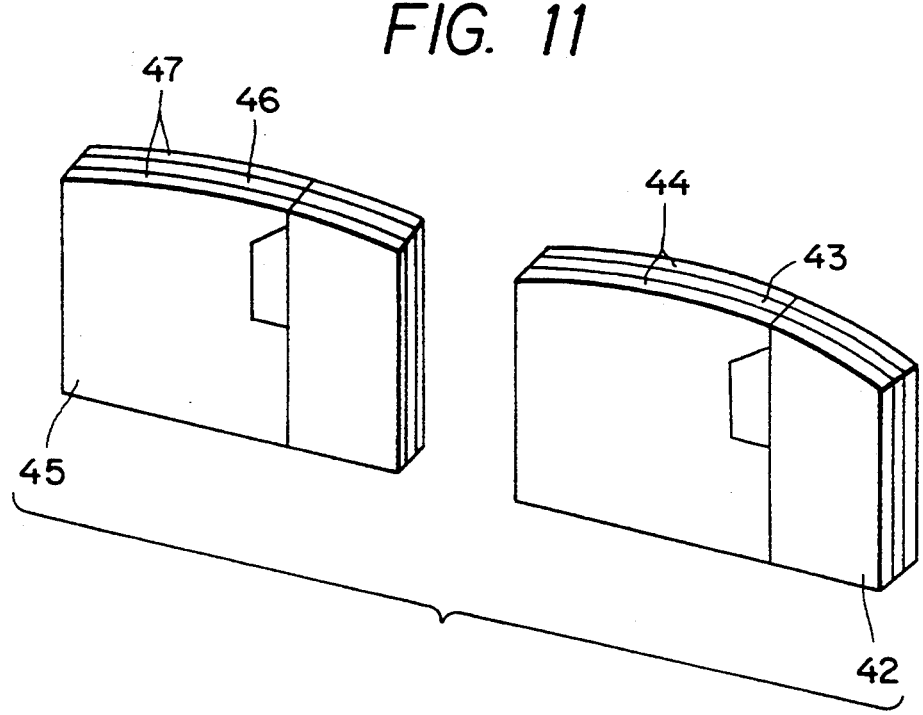
FIG. 11 is an enlarged view of head tips of the magnetic head shown in FIG. 10.

As shown in FIGS. 10, 11, another combination magnetic head 41 according to the present invention may have a leading head tip 42 of a laminated structure comprising a first magnetic body or layer 43 sandwiched between first nonmagnetic substrates 44 each of a TiO$_2$-MgO (titanium dioxide-magnesium oxide) ceramic material whose specific wear has a value of $8.3 \times 10^{-18} m^2$ and a trailing tip 45 of a laminated structure comprising a second magnetic body 46 sandwiched between second nonmagnetic substrates 47 each of a TiO$_2$-CaO (titanium dioxide-calcium oxide) ceramic material whose specific wear has a value of $15 \times 10^{-18} m^2$.

Single-crystal materials wear to different degrees depending on the orientations of crystal faces. For example, the (111) face of single-crystal ferrite has greater specific wear, but the (110) face thereof has smaller specific wear. Therefore, a combination magnetic head may comprise a leading head tip of ferrite which has a surface for sliding contact with a magnetic video tape, the surface being the (110) face of ferrite, and a trailing head tip of ferrite whose surface for sliding contact with the magnetic video tape is the (111) face of ferrite.

Figure 6:
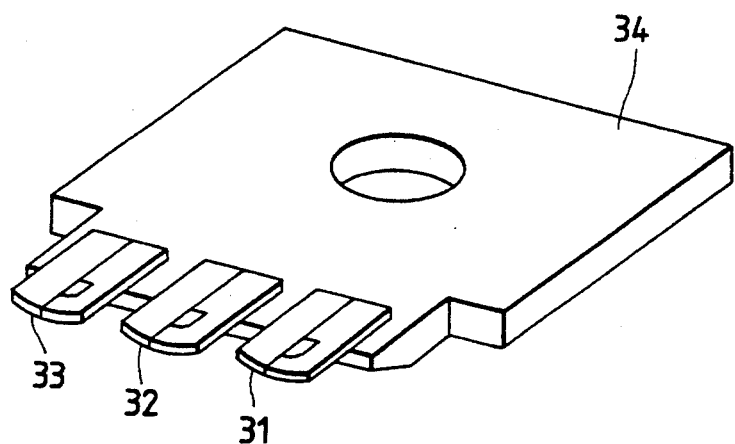
FIG. 6 is a perspective view of a magnetic head according to another embodiment of the present invention.
Figure 7:
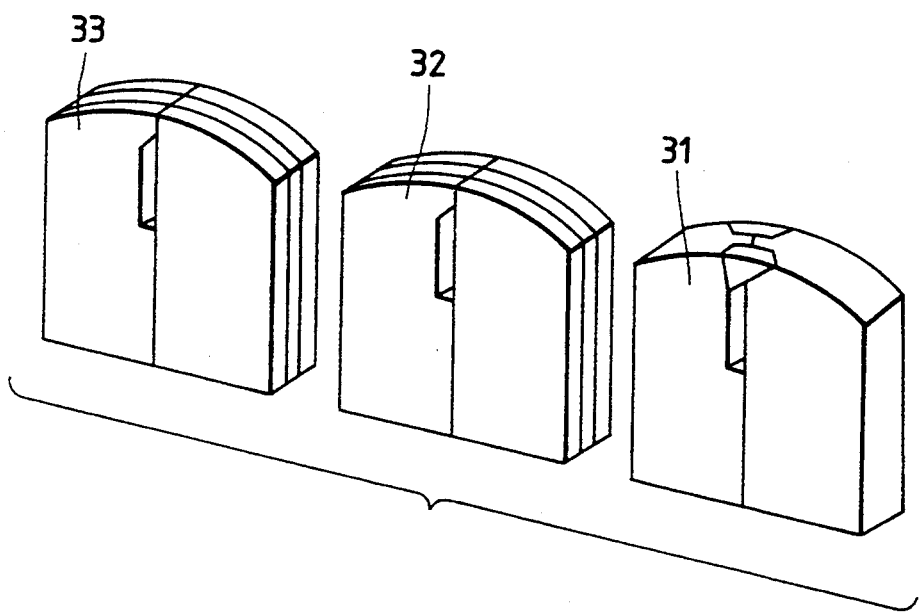
FIG. 7 is an enlarged perspective view of head tips of the magnetic head shown in FIG. 6.

FIG. 6 shows a multitrack combination magnetic head according to another embodiment of the present invention, the multitrack magnetic head having three head tips. FIG. 7 shows the head tips at enlarged scale.

As shown in FIGS. 6 and 7, the magnetic head, generally designated by the reference numeral 35, comprises a leading head tip 31, a middle head tip 32, and a trailing head tip 33 which are positioned at spaced intervals and mounted on an edge of a head base 34. The magnetic head 35 is mounted on a rotary head drum or cylinder assembly, similar to the rotary head drum assembly 20 shown in FIG. 3, so that the leading head tip 31 comes into sliding contact with the magnetic video tape earlier than the middle and trailing head tips 32, 33.

The leading head tip 31 is made of Mn-Zn ferrite whose specific wear has a value of $5.0 \times 10^{-18} m^2$. The middle head tip 32 is of a laminated structure comprising a magnetic body which serves as a magnetic path and is sandwiched between nonmagnetic substrates each made of an NiO-TiO$_2$-MgO ceramic material whose specific wear has a value of $7.2 \times 10^{-18} m^2$. The trailing head tip 33 is also of a laminated structure comprising a magnetic body which serves as a magnetic path and is sandwiched between nonmagnetic substrates each made of a TiO$_2$BaO (titanium dioxide-barium oxide) ceramic material whose specific wear has a value of $10 \times 10^{-18} m^2$.

Figure 9A:
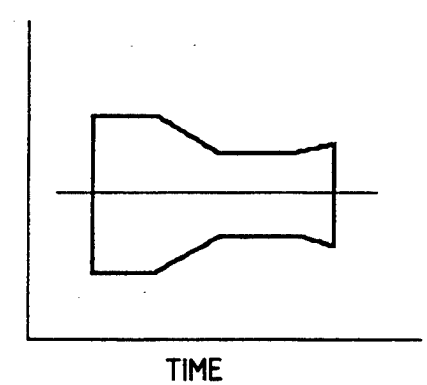
FIGS. 9A through 9C are diagrams showing the waveform envelopes of reproduced outputs from head tips according to another comparative example.
Figure 9B:
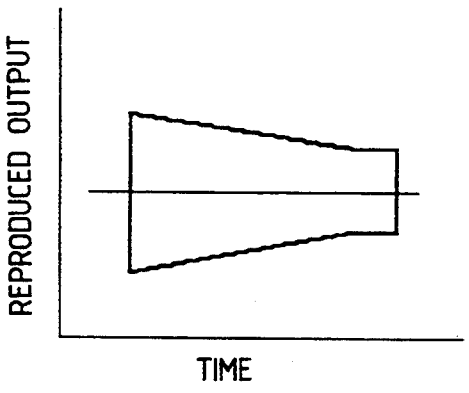
Figure 9C:
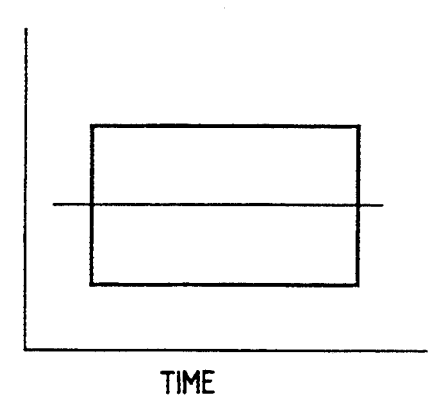

With a conventional multitrack combination magnetic head having leading, middle, and trailing head tips of the same material, the leading head tip is contacted by a magnetic video tape under higher pressure than the middle and trailing head tips. Therefore, the leading head tip wears more rapidly into a greater transverse radius of curvature than the trailing head tip. When a thinner magnetic video tape is played back by the conventional multitrack combination magnetic head after a thicker magnetic video tape has been played back thereby, the leading head tip is not held in good contact with the magnetic video tape, and its reproduced output decreases in level. FIGS. 9A and 9B show the waveform envelopes of the reproduced outputs of the leading and middle head tips of the conventional multitrack combination magnetic head, whereas FIG. 9C shows the waveform envelope of the reproduced output of the trailing head tip thereof. It can be seen from FIGS. 9A, 9B, and 9C that the reproduced outputs of the leading and middle head tips become progressively lower in level with time.

Figure 8A:
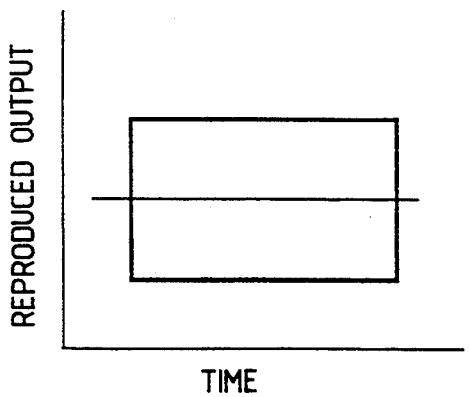
FIGS. 8A through 8C are diagrams showing the waveform envelopes of reproduced output of the head tips shown in FIG. 7.
Figure 8B:
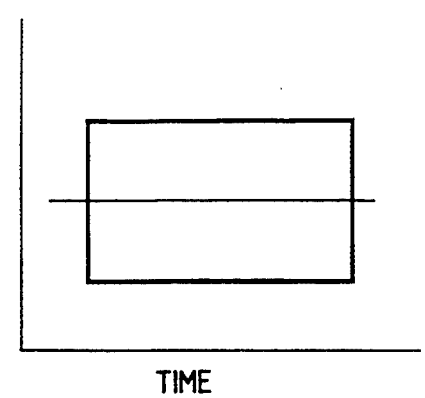
Figure 8C:
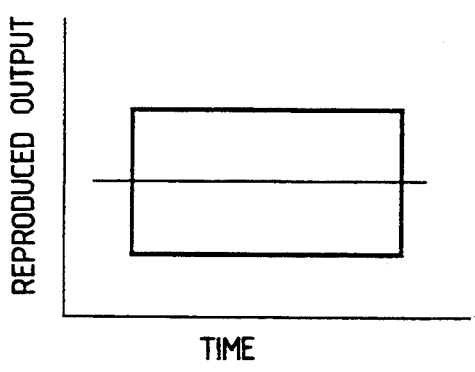

According to the present invention, the leading, middle, and trailing head tips 31, 32, 33 have progressively lower wear resistances, and hence their projecting portions wear to substantially equal degrees and have substantially equal radii of curvature in the transverse direction. Therefore, the leading, middle, and trailing head tips 31, 32, 33 produce output levels that are essentially the same as each other. The waveform envelopes of the reproduced outputs of the leading, middle, and trailing head tips 31, 32, 33 are substantially equal to each other and remain substantially constant with time, as shown in FIGS. 8A, 8B, and 8C. Inasmuch as the projecting portions of the leading, middle, and trailing head tips 31, 32, 33 wear substantially equally, the tape running times until they are worn to the gap depth are substantially the same as each other. As a consequence, the leading, middle, and trailing head tips 31, 32, 33 have substantially equal service lives.

Figure 12:
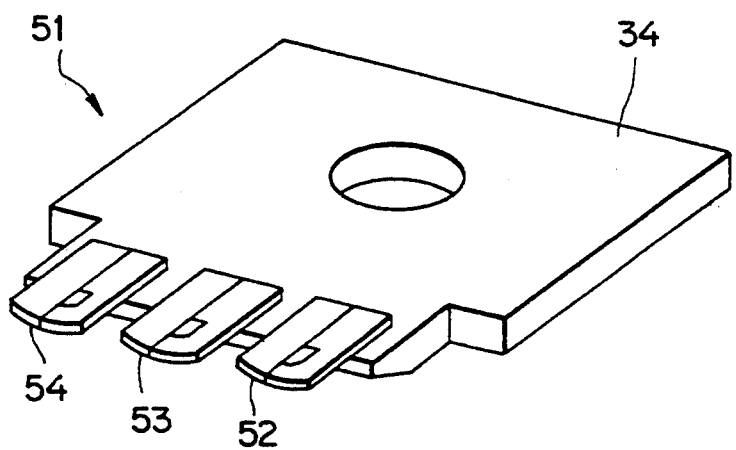
FIG. 12 is a diagonal view of a magnetic head according to another embodiment of the present invention.
Figure 13:
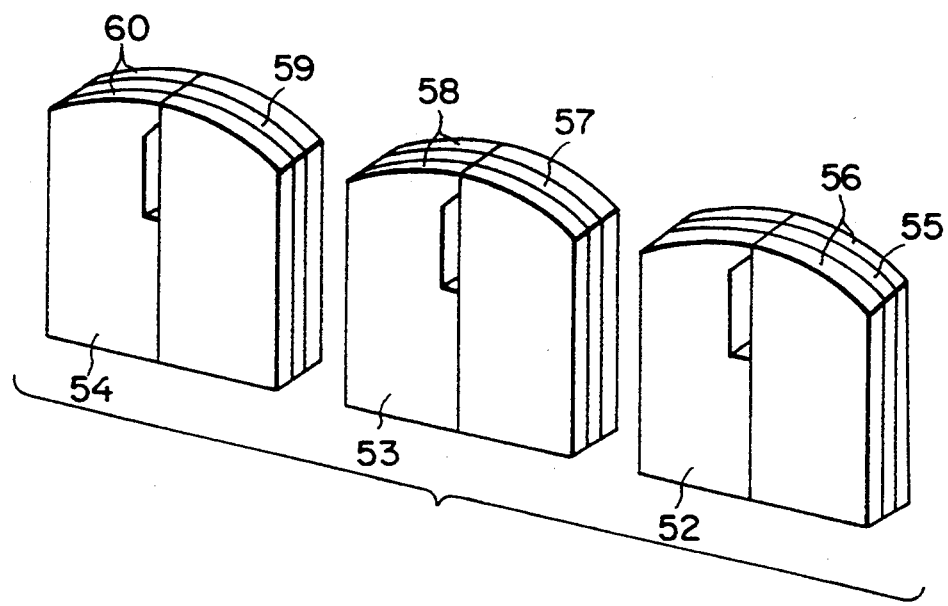
FIG. 13 is an enlarged view of head tips of the magnetic head shown in FIG. 12.

As shown in FIGS. 12, 13, another multitrack combination magnetic head 51 according to the present invention may comprise a leading head tip 52, a middle head tip 53, and a trailing head tip 54. The leading head tip 52 comprises a magnetic body 55 which serves as a magnetic path and is sandwiched between first nonmagnetic substrates 56. The middle head tip 53 comprises a magnetic body 57 which serves as a magnetic path and is sandwiched between second nonmagnetic substrates 58, the trailing head tip 54 comprises a magnetic body 59 which serves as a magnetic path and is sandwiched between third nonmagnetic substrates 60. The first nonmagnetic substrate 56 of the leading head tip 52 is made of TiO$_2$MgO ceramic material whose specific wear has a value of $8.3 \times 10^{-18} m^2$ the second nonmagnetic substrate 58 of the middle head tip 53 is made of TiO$_2$CaO ceramic material whose specific wear has a value of $15 \times 10^{-18} m^2$, and the third nonmagnetic substrate 60 of the trailing head tip 54 is made of NiO-MnO (nickel oxide-manganese oxide) ceramic material whose specific wear has a value of $19 \times 10^{-18} m^2$.

Furthermore, still another multitrack combination magnetic head according to the present invention may include a leading head tip of Mn-Zn ferrite and successive head tips each comprising a magnetic body serving as a magnetic path and sandwiched between any nonmagnetic substrates whose specific wear is greater than that of Mn-Zn ferrite.

Figure 14:
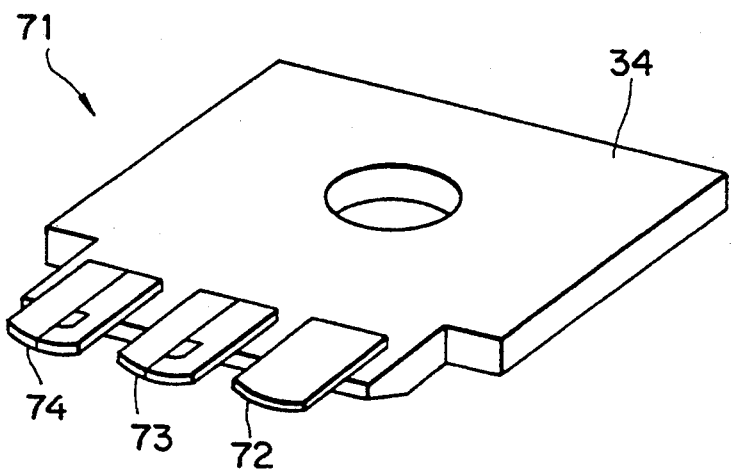
FIG. 14 is a diagonal view of a magnetic head according to still another embodiment of the present invention.
Figure 15:
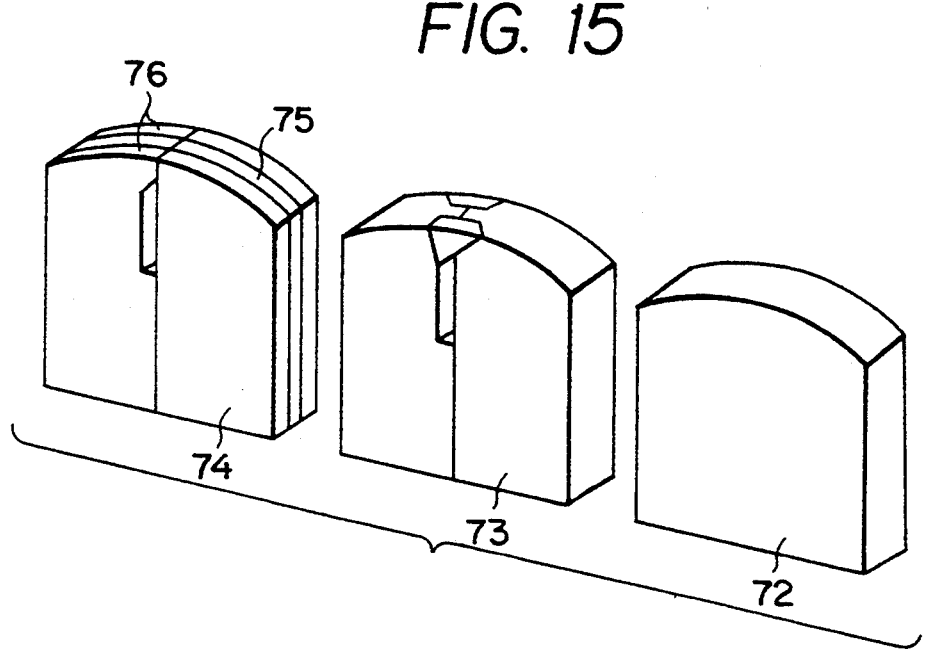
FIG. 15 is an enlarged view of head tips of the magnetic head shown in FIG. 14.

As shown in FIGS. 14, 15, another to a further modification, a multitrack combination magnetic head 71 may comprise a bulk-type dummy head tip 72 of Mn-Zn ferrite, a leading head tip 73 of Mn-Zn ferrite which follows the bulk-type dummy head tip 72, and a trailing head tip 74 comprising a magnetic body 75 serving as a magnetic path and sandwiched between nonmagnetic substrates 76 whose specific wear is greater than that of Mn-Zn ferrite.

Alternatively, a multitrack combination magnetic head may comprise three head tips having different values of specific wear which are achieved by employing different faces of single-crystal ferrite or substrate material.

While two or three head tips have been shown and described in the above embodiments, a multitrack combination magnetic head may comprise four or more head tips positioned in a window or recess defined in the outer circumferential surface of a rotary head drum assembly.

A magnetic head according to the present invention may be of any of various configurations insofar as the values of specific wear of the head tips are progressively greater from the leading head tip toward the trailing head tip with respect to the direction in which the rotary head drum assembly rotates.

The principles of the present invention are applicable to not only a laminated multitrack combination magnetic head, but also a bulk-type ferrite magnetic head and a metal-in-gap magnetic head. The multitrack magnetic head according to the present invention may be incorporated in not only a magnetic recording and reproducing system with a rotary head drum assembly, but also a magnetic recording and reproducing system with a rotary head drum rotatable between two fixed drums or cylinders, or a magnetic recording and reproducing system with a fixed magnetic head against which a magnetic tape runs at high speed.

Although certain preferred embodiments of the present invention have been shown and described in detail, it should be understood that various changes and modifications may be made therein without departing from the scope of the appended claims.

What is claimed is:

1. A multitrack magnetic head assembly for scanning a magnetic tape comprising:
    a head base;
    a leading head tip mounted on an edge of the head base for coming into initial sliding contact with the magnetic tape, the leading head tip being of a laminated structure comprising a pair of first non-magnetic substrates made of a $TiO_2MgO$ ceramic material and a first magnetic body which serves as a magnetic path and is sandwiched between the first non-magnetic substrates; and
    a trailing head tip mounted on the edge of the head base for coming into subsequent sliding contact with the magnetic tape, the trailing head tip being a laminated structure comprising a pair of second non-magnetic substrates made of a $TiO_2$-CaO ceramic material and a second magnetic body which serves as a magnetic path and is sandwiched between the second non-magnetic substrates.

2. A multitrack magnetic head assembly according to claim 1, in which the $TiO_2$-MgO ceramic material has a specific wear of $8.3 \times 10^{-18}$ $m^2$.

* * * * *